Figure 1:
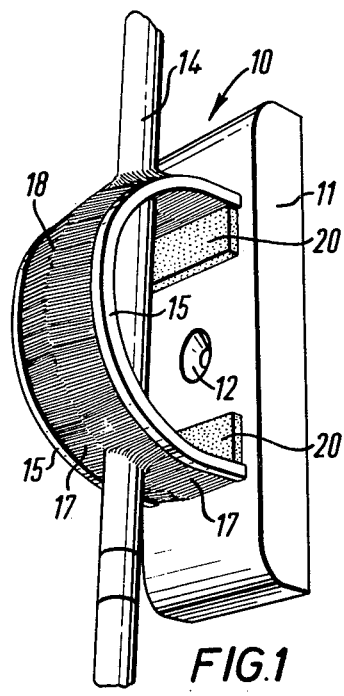

United States Patent [19]

Berry

[11] 4,325,484
[45] Apr. 20, 1982

[54] HOLDER FOR ELONGATED ARTICLES

[75] Inventor: Richard M. Berry, Bristol, England

[73] Assignee: Kleeneze Limited, England

[21] Appl. No.: 24,026

[22] Filed: Mar. 26, 1979

[30] Foreign Application Priority Data

Mar. 29, 1978 [GB] United Kingdom ............... 12191/78

[51] Int. Cl.³ .............................................. A47F 7/00
[52] U.S. Cl. ................................... 211/66; 211/60 R; 211/89; 248/309 R
[58] Field of Search ................... 211/60 T, 69, 65, 89, 211/66, 67, 68; 248/110–113, 317, 309 R

[56] References Cited

U.S. PATENT DOCUMENTS

| 782,442 | 2/1905 | Flanigan | 211/67 |
| 1,733,868 | 10/1929 | Durell | 211/60 T |
| 3,759,538 | 9/1973 | Fabiano | 211/60 T X |
| 4,177,903 | 12/1979 | Edelson et al. | 211/89 X |

FOREIGN PATENT DOCUMENTS

| 493689 | 6/1950 | Belgium | 211/89 |
| 327532 | 7/1935 | Italy | 211/89 |
| 29932 | of 1911 | United Kingdom | 211/89 |

Primary Examiner—Roy D. Frazier
Assistant Examiner—Robert W. Gibson, Jr.
Attorney, Agent, or Firm—Ostrolenk, Faber, Gerb & Soffen

[57] ABSTRACT

The invention relates to a holder for elongated articles such as handles of brooms, fishing rods and other sporting equipment. The holder comprises a base member 11 to which is attached a pair of curved metal strips 15 of channel construction. An elongated bristle strip 17 is mounted in each metal strip 15 so that the bristle strips extend towards each other in end-to-end contact. The bristles may, however, be spaced apart and the metal strips 15 may be adjustably mounted on the base member 11.

8 Claims, 8 Drawing Figures

HOLDER FOR ELONGATED ARTICLES

This invention relates to holders for elongated articles such as the handles of brooms and gardening tools, guns, billiard cues, fishing rods and other sporting equipment, such articles being hereinafter referred to in the following description and claims as elongated articles.

An object of the invention is to provide a unitary holder of simple construction which can be easily and quickly attached to a supporting structure such as a wall, a cupboard surface or a free-standing support such as a rack. A further more specific object is to provide a holder which is capable of holding an elongated article in a positive, predetermined manner in relation to a support structure.

In its broadest aspect the invention provides a holder for elongated articles as herein defined, said holder comprising a base member for attachment to a supporting structure, a pair of metal strips each of part circular or like configuration, the ends of the strips being attached to said base member so that the portions of said strips intermediate their ends extend substantially parallel to each other and project outwardly from said base member, and a resilient bristle strip mounted in each of said metal strips, said bristle strips extending from said metal strips in opposing relationship for holding therebetween an elongated article in a plane spaced from but substantially parallel to that of said base member.

In a preferred embodiment the pair of metal strips are of semi-circular shape and are mounted on the base member in spaced relation so that the bristles of the bristle strips mounted therein are in end-to-end contact. In other embodiments of the invention the metal strips are mounted on the base member so that the opposing ends of the bristles of the strips are spaced apart a predetermined distance.

In a further embodiment of the invention the metal strips supporting the bristle strips are movably mounted on the base member so that the spacing between the end of the bristle strips can be adjusted to suit the particular requirements of the user.

A plurality of holders may be attached to a common base member in spaced relationship thereon to form a holder assembly. The holders may be attached to one or both sides of the common base member which in a further embodiment of the invention may be supported substantially horizontally by a frame carried by a base structure. The base structure may be formed with apertures or other receiving means for supporting the lower end of an elongated article located in a corresponding holder on the base member.

Figure 2:
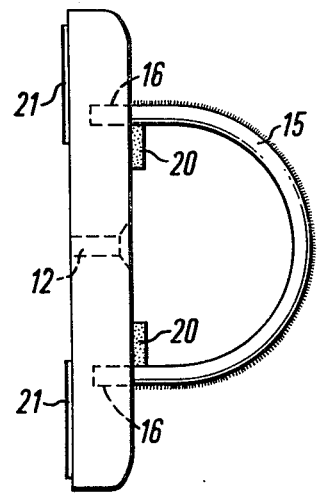
Figure 3:
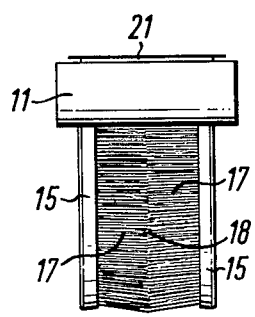
Figure 4:
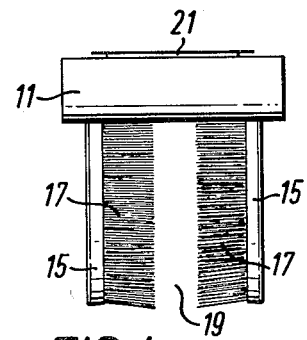
Figure 5:
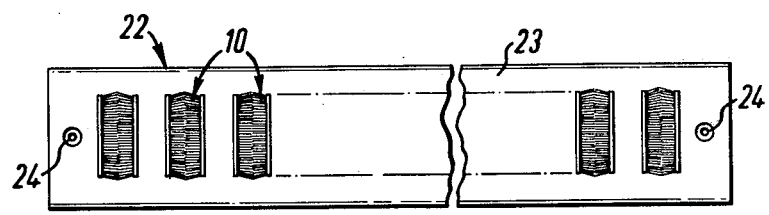
Figure 6:
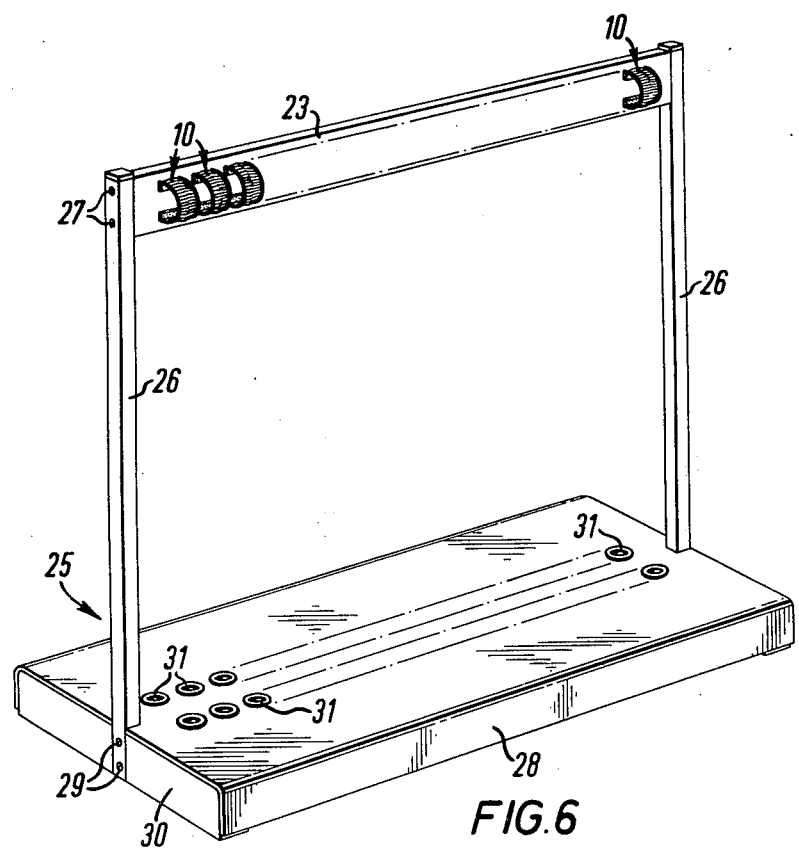
Figure 7:
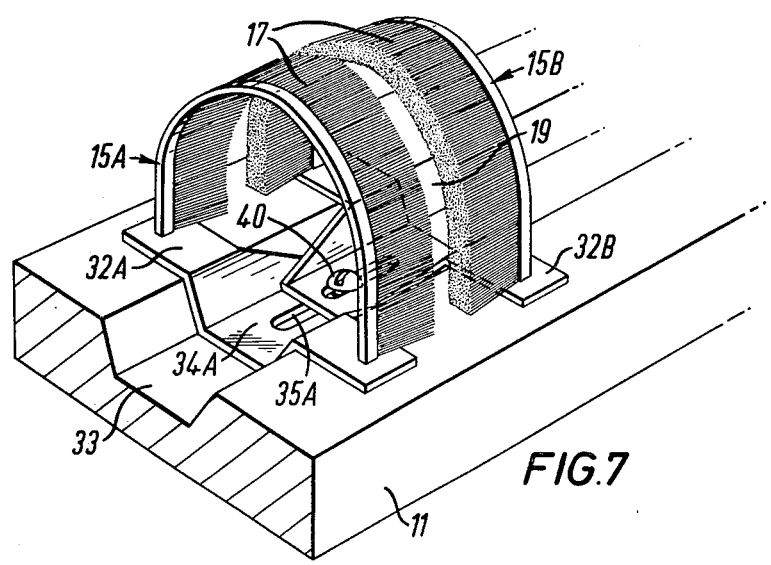
Figure 8:
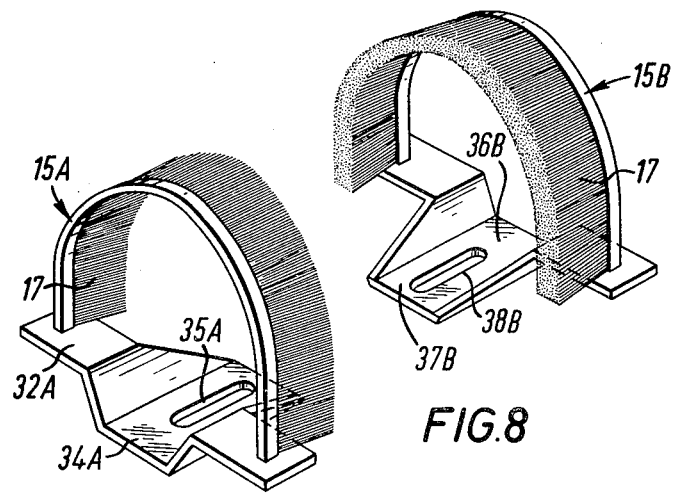

In order that the invention may be clearly understood the preferred embodiments referred to above will now be described in greater detail with reference to the accompanying drawings, in which:

FIG. 1 is a perspective view of a holder of the invention showing a rod suspended therein, FIG. 2 is a side elevation of the holder of FIG. 1, FIG. 3 is a plan view of the holder of FIG. 1, FIG. 4 is a similar plan view of a holder in which the ends of the bristle strips are spaced apart, FIG. 5 is a front elevation of a holder assembly consisting of a number of holders as shown in FIGS. 1 to 3, FIG. 6 is a perspective view of a free-standing rack having a plurality of holders and a supporting base structure, FIG. 7 is a perspective view of a further embodiment of a holder in accordance with the invention in which the metal strips are adjustably mounted on the base member, and FIG. 8 is a perspective view of the bristle supporting strips of the embodiment of FIG. 7.

Referring now to FIGS. 1 to 3 of the drawings a holder 10 in accordance with the invention comprises a base member 11 of wood, a plastics or other suitable material and which is adapted for mounting on a base structure (not shown) which may be a wall, a cupboard surface or the frame of a free-standing rack. The base member 11 is formed with a centrally positioned aperture 12 for a mounting screw.

The portion 13 of the holder for receiving and holding an elongated member, shown as a rod 14 in FIG. 1, comprises a pair of spaced metal strips 15 of channel construction and which have a part circular shape, the ends 16 of each strip being embedded and secured in the base member 11. An elongated bristle strip 17 is mounted in each channel-shaped metal strip 15 prior to its attachment to the base member 11. Each bristle strip 17 consists of nylon brush fibers looped over a wire core, the brush strips being held in place in the metal channels by cleating, crimping or other locking. In the embodiment shown in FIGS. 1 to 3 the metal strips 15 are attached to the base member 11 so that the bristle strips 17 extend towards each other and are in end-to-end contact as shown at 18. Such an arrangement is suitable for receiving and securing articles of a relatively small diameter such as fishing rods which by suitably mounting the holder can be suspended vertically, horizontally or in any desired angular position.

The metal strips 15 shown in the embodiment of FIGS. 1 to 3 are each of semi-circular shape (FIG. 2) with short straight ends 16 embedded in the base member. In one particular example of the holder the semi-circular portion of the strips 15 projects outwardly from the base member 11 a distance of 42 cms and the ends 16 of each strip are spaced apart a distance of 65 cms.

In the embodiment of FIGS. 1 to 3 the metal strips 15 are spaced apart 30 cms, but by increasing this distance to 40 or 50 cms, the ends of the bristle strips 17 can be spaced apart as shown in FIG. 4 to give a space 19 therebetween to receive articles of larger diameter, such as broom handles or gun barrels.

Although the metal strips 15 are shown as of semi-circular shape, any projecting shape can be utilised such as rectangular, V-shaped or any other configuration producing a substantially circular portion projecting from the base member.

The holder 10 is completed by resilient pads 20 secured to the base member 11 adjacent each of the ends 16 of the strips 15 for engagement by the rod 14. Alternative fixing arrangements may be provided such as the adhesive fixing pads 21 on the base member 11.

The projecting shape of the portion 13 of the holder enables relatively long articles to be held securely in a releasable manner in any desired position and in a plane substantially parallel to that of the base member. The resilient bristles may be of any desired size and width and may be formed of any desired natural or synthetic material.

In FIG. 5 a holder assembly 22 is shown consisting of a number of spaced holders 10 each attached directly to a common base member 23 having attachment means 24. Holders 10 may be attached to one or both sides of member 23 so that a plurality of articles can be easily and neatly suspended.

The embodiment of FIG. 6 shows a holder assembly in which a common base member 23 is carried by a free-standing rack 25. The rack 25 comprises a pair of spaced upright tubes 26 attached as by screws 27 to the base member 23. The upright tubes 26 are connected to the ends of a base 28 of channel shape. The ends of the base 28 are cut to receive the tubes 26 and to provide a tongue which is bent downwardly to permit fixing of the tubes 26 by screws 29 into an end block 30. The base 28 is formed with apertures fitted with caps 31 each associated with a holder 10 to support the lower end of the article. The base 28 may, of course, be shaped to suit the articles suspended, e.g. the stocks of guns may be fitted in suitable recesses.

The embodiment of the invention shown in FIGS. 7 and 8 comprises a holder in which the gap 19 between the ends of the bristle strips 17 is adjustable to suit the particular requirements of the user. As shown, the hooped metal strips 15A and 15B of the holder are mounted on metal, for example pressed steel, plates 32A, 32B respectively and the metal plates are shaped to fit snugly within a U-shaped groove formed in a wooden base member 11. The base portion 34A of the plate 32A is formed with a slot 35A, while base portion 36B of plate 32B is formed with a tongue section 37B provided with a slot 38B. The plates 32A and 32B are adjustable in a sliding manner in a groove 33 and as shown in FIG. 7 the tongue 37B of plate 32B overlaps the base portion 34A of plate 32A to allow the fixing of the strips 15A and 15B in a predetermined relationship by means of a screw 40.

What is claimed is:

1. A holder for elongated articles as herein defined, said holder comprising a base member for attachment to a supporting structure, a pair of strips each having opposite ends attachable to a base member and each having other than a straight configuration between the ends thereof and also being shaped to project out from the base member between the opposite ends of the strip, such that an elongated article disposed between the strips would cross each strip at two spaced apart locations along the strip, the ends of the strips being attached to said base member so that the portions of said strips intermediate their ends extend substantially parallel to each other and project outwardly from said base member, said strips each being of channel section with the channels of said strips extending toward each other, and a resilient bristle strip mounted in the channel of each of said strips, said bristle strips each comprising a plurality of brush fibers, said brush fibers extending from said strips in opposing relationship for holding therebetween an elongated article in a plane spaced from but substantially parallel to that of said base member a resilient pad being attached to the base member between adjacent ends of the pair of strips.

2. A holder as claimed in claim 1, wherein the bristle strips are crimped in said channels.

3. A holder assembly as claimed in claim 1, wherein each of said strips is of part circular, or the like, configuration.

4. A holder as claimed in any of claims 1 or 3 wherein said strips are attached to the base member so that said bristles of said strips are in end-to-end contact.

5. A holder as claimed in any one of claims 1, 2 or 3, wherein said strips are attached to said base member so that the opposing ends of the bristles of the strips are spaced apart a predetermined distance.

6. A holder assembly in which a plurality of holders as claimed in any one of claims 1, 2 or 3 are attached in spaced relationship on a common base member.

7. A holder assembly as claimed in claim 6, wherein a plurality of said holders are attached in spaced relationship to at least one side of a common base member supported substantially horizontally by a frame carried by a base structure.

8. A holder assembly as claimed in claim 7, wherein the base structure is formed with receiving means and for supporting the lower end of an elongated article located in a corresponding holder on the base member.

* * * * *